United States Patent
Schinzler et al.

(10) Patent No.: US 11,507,372 B2
(45) Date of Patent: Nov. 22, 2022

(54) PROCESSING OF INSTRUCTIONS FETCHED FROM MEMORY

(71) Applicant: Arm Limited, Cambridge (GB)

(72) Inventors: Michael Brian Schinzler, Round Rock, TX (US); Yasuo Ishii, Austin, TX (US); Muhammad Umar Farooq, Austin, TX (US); Jason Lee Setter, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/064,983

(22) Filed: Oct. 7, 2020

(65) Prior Publication Data
US 2022/0107807 A1 Apr. 7, 2022

(51) Int. Cl.
*G06F 9/30* (2018.01)
*G06F 9/38* (2018.01)
*G06F 12/0875* (2016.01)

(52) U.S. Cl.
CPC ........ *G06F 9/30043* (2013.01); *G06F 9/3016* (2013.01); *G06F 9/3802* (2013.01);
(Continued)

(58) Field of Classification Search
CPC .................................................... G06F 9/3836
See application file for complete search history.

(56) References Cited

U.S. PATENT DOCUMENTS 6,681,295 B1 * 1/2004 Root .................. G06F 9/30047
711/128
7,269,715 B2 * 9/2007 Le ........................ G06F 9/3802
712/215

(Continued)

*Primary Examiner* — Michael J Metzger
(74) *Attorney, Agent, or Firm* — Nixon & Vanderhye P.C.

(57) ABSTRACT

An apparatus and method are provided for processing instructions fetched from memory. Decode circuitry is used to decode the fetched instructions in order to produce decoded instructions, and downstream circuitry then processes the decoded instructions in order to perform the operations specified by those decoded instructions. Dispatch circuitry is arranged to dispatch to the downstream circuitry up to N decoded instructions per dispatch cycle, and is arranged to determine, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle. The dispatch circuitry has resource checking circuitry arranged, by default, to perform a resource checking operation during the given dispatch cycle to generate, for the given candidate sequence of decoded instructions, resource conflict information used to determine whether a resource conflict would occur. Resource conflict information cache storage is provided to maintain, for one or more sequences of decoded instructions, associated resource conflict information. In the event that the given candidate sequence matches one of the sequences for which associated resource conflict information is cached, the dispatch circuitry employs the associated cached resource conflict information to determine whether a resource conflict would occur, instead of invoking the resource checking circuitry to perform the resource checking operation.

13 Claims, 8 Drawing Sheets

(52) U.S. Cl.
CPC ........ *G06F 9/3836* (2013.01); *G06F 12/0875* (2013.01); *G06F 2212/452* (2013.01)

(56) References Cited

U.S. PATENT DOCUMENTS

| | | | | |
|---|---|---|---|---|
| 10,515,049 B1* | 12/2019 | Fleming | .............. | G06F 15/7892 |
| 2005/0149689 A1* | 7/2005 | Sodani | .................. | G06F 9/3838 |
| | | | | 712/1 |
| 2011/0202731 A1* | 8/2011 | Ohmacht | ............ | G06F 9/30072 |
| | | | | 711/141 |
| 2014/0244976 A1* | 8/2014 | Sundar | .................... | G06F 9/382 |
| | | | | 712/213 |

* cited by examiner

Body:
```
ADD
SUB
LDR
STR
```
Label:
```
AND
OR
BNE
...
...
...
```

These two mix of instructions may have totally different resource check output since the place of instructions is different.

For first flow BNE stays at $7^{th}$ place of stream while it is at $3^{rd}$ place in second stream. This difference may cause different resource check output (e.g., $1^{st}$ instruction and $4^{th}$ instruction share certain resource)

FIG. 4

| | Fetch | | | Decode | Rename | Issue | Execute | Commit |
|---|---|---|---|---|---|---|---|---|
| | F0 | F1 | F2 | DE | RD | IS | SX | CT |
| Cycle Description without Bypass | Tag RAM Read | Data RAM reads | Way Muxing<br>Entry alignment<br>Write in queue | Read queue<br>Decompress mop<br>Port Share | Present mops to Rename | Rename Dispatch to Issue queues | | |

| | Fetch/Decode | | | Decode | Rename | Issue | Execute | Commit |
|---|---|---|---|---|---|---|---|---|
| | F0 | F1 | F2/DE | RR | RD | IS | SX | CT |
| Cycle Description with Bypass | Tag RAM Read | Data RAM reads | Way Muxing<br>~~Entry alignment~~<br>~~Write in queue~~<br>~~Read queue~~<br>Decompress Mop<br>~~Port Share~~<br>Write in RR | Present mops to Rename | Rename Dispatch to Issue queues | | | |

FIG. 8

PROCESSING OF INSTRUCTIONS FETCHED FROM MEMORY

BACKGROUND

The present technique relates to the processing of instructions fetched from memory, and more particularly to the efficient handling of such instructions within a data processing system.

Modern data processing systems employ processing pipelines that have multiple different hardware structures provided in order to increase the instruction execution capability. For example, a number of different execution units may be provided within the processing pipeline to allow multiple instructions to be executed in parallel. Blocks of instructions can be fetched from memory and decoded in order to produce a corresponding series of decoded instructions that can then be dispatched for execution by the execution units. In modern data processing systems it is possible to dispatch multiple decoded instructions in a given dispatch cycle, but exactly how many instructions can be dispatched in each dispatch cycle without causing resource conflicts in the downstream circuitry may depend on the particular group of decoded instructions being considered for dispatch.

Hence, the dispatch circuitry used to dispatch decoded instructions for execution will typically need to perform a resource checking function to determine whether, for a particular sequence of decoded instructions being considered for dispatch, there would be any downstream resource conflict if all of those instructions were dispatched at the same time. If such a resource conflict is detected, then the dispatch circuitry may only dispatch a subset of those decoded instructions in a particular dispatch cycle, and the remaining instructions may be dispatched later.

The need to perform such resource checking can impact performance. For example, the need to perform such resource checking prior to dispatching the instructions may introduce an additional stage in the processing pipeline, which can impact performance in certain situations. For instance, following a branch misprediction, it is typically necessary to flush the pipeline and begin refetching of instructions from a new target address, and at that point any additional pipeline stage increases the latency associated with recovering from such a misprediction. Accordingly, it would be desirable to provide an improved mechanism for processing instructions fetched from memory, which enables a reduction in the performance impact resulting from the need to perform such resource checking.

SUMMARY

In one example configuration, there is provided an apparatus comprising: fetch circuitry to fetch instructions from memory; decode circuitry to decode fetched instructions in order to produce decoded instructions; downstream circuitry to process the decoded instructions in order to perform the operations specified by those decoded instructions; and dispatch circuitry arranged to dispatch to the downstream circuitry up to N decoded instructions per dispatch cycle, where N is an integer greater than 1; wherein: the dispatch circuitry is arranged to determine, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle; the dispatch circuitry comprises resource checking circuitry which by default is arranged to perform, during the given dispatch cycle, a resource checking operation to generate, for the given candidate sequence of decoded instructions, resource conflict information used to determine whether the at least one resource conflict would occur; the apparatus further comprises resource conflict information cache storage to maintain, for one or more sequences of decoded instructions, associated resource conflict information; and the dispatch circuitry is arranged, in the event that the given candidate sequence matches one of the sequences for which associated resource conflict information is maintained in the resource conflict information cache storage, to employ the associated resource conflict information retrieved from the resource conflict information cache storage to determine whether the at least one resource conflict would occur, instead of invoking the resource checking circuitry to perform the resource checking operation.

In another example configuration, there is provided a method of processing instructions fetched from memory, comprising: decoding the fetched instructions in order to produce decoded instructions; employing downstream circuitry to process the decoded instructions in order to perform the operations specified by those decoded instructions; and performing a dispatch process to dispatch to the downstream circuitry up to N decoded instructions per dispatch cycle, where N is an integer greater than 1; wherein: the dispatch process comprises determining, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle; the dispatch process is arranged, by default, to employ resource checking circuitry to perform, during the given dispatch cycle, a resource checking operation to generate, for the given candidate sequence of decoded instructions, resource conflict information used to determine whether the at least one resource conflict would occur; the method further comprises maintaining within a resource conflict information cache storage, for one or more sequences of decoded instructions, associated resource conflict information; and the dispatch process is arranged, in the event that the given candidate sequence matches one of the sequences for which associated resource conflict information is maintained in the resource conflict information cache storage, to employ the associated resource conflict information retrieved from the resource conflict information cache storage to determine whether the at least one resource conflict would occur, instead of invoking the resource checking circuitry to perform the resource checking operation.

In a still further example configuration, there is provided an apparatus comprising: fetch means for fetching instructions from memory; decode means for decoding fetched instructions in order to produce decoded instructions; downstream processing means for processing the decoded instructions in order to perform the operations specified by those decoded instructions; and dispatch means for dispatching to the downstream processing means up to N decoded instructions per dispatch cycle, where N is an integer greater than 1; wherein: the dispatch means is for determining, based on a given candidate sequence of decoded instructions being considered for dispatch in a given dispatch cycle, whether at least one resource conflict within the downstream processing means would occur in the event that the given candidate sequence of decoded instructions is dispatched in the given dispatch cycle; the dispatch means comprises resource checking means for performing, during the given dispatch cycle, a resource checking operation to generate, for the given candidate sequence of decoded instructions, resource conflict information used to determine whether the at least one resource conflict would occur; the apparatus further comprises resource conflict information caching means for maintaining, for one or more sequences of decoded instructions, associated resource conflict information; and the dispatch means is arranged, in the event that the given candidate sequence matches one of the sequences for which associated resource conflict information is maintained in the resource conflict information caching means, to employ the associated resource conflict information retrieved from the resource conflict information caching means to determine whether the at least one resource conflict would occur, instead of invoking the resource checking means to perform the resource checking operation.

BRIEF DESCRIPTION OF THE DRAWINGS

The present technique will be described further, by way of illustration only, with reference to examples thereof as illustrated in the accompanying drawings, in which:

FIG. 4 schematically illustrates how different mixes of decoded instructions can result in different resource checking conclusions, such that the resource checking output is dependent on the particular mix of instructions being considered at any particular point in time;

FIG. 8 schematically illustrates how the number of pipeline stages can be reduced in situations where it is possible to use the bypass path of FIG. 1, in accordance with one example implementation.

DESCRIPTION OF EXAMPLES

Figure 1:
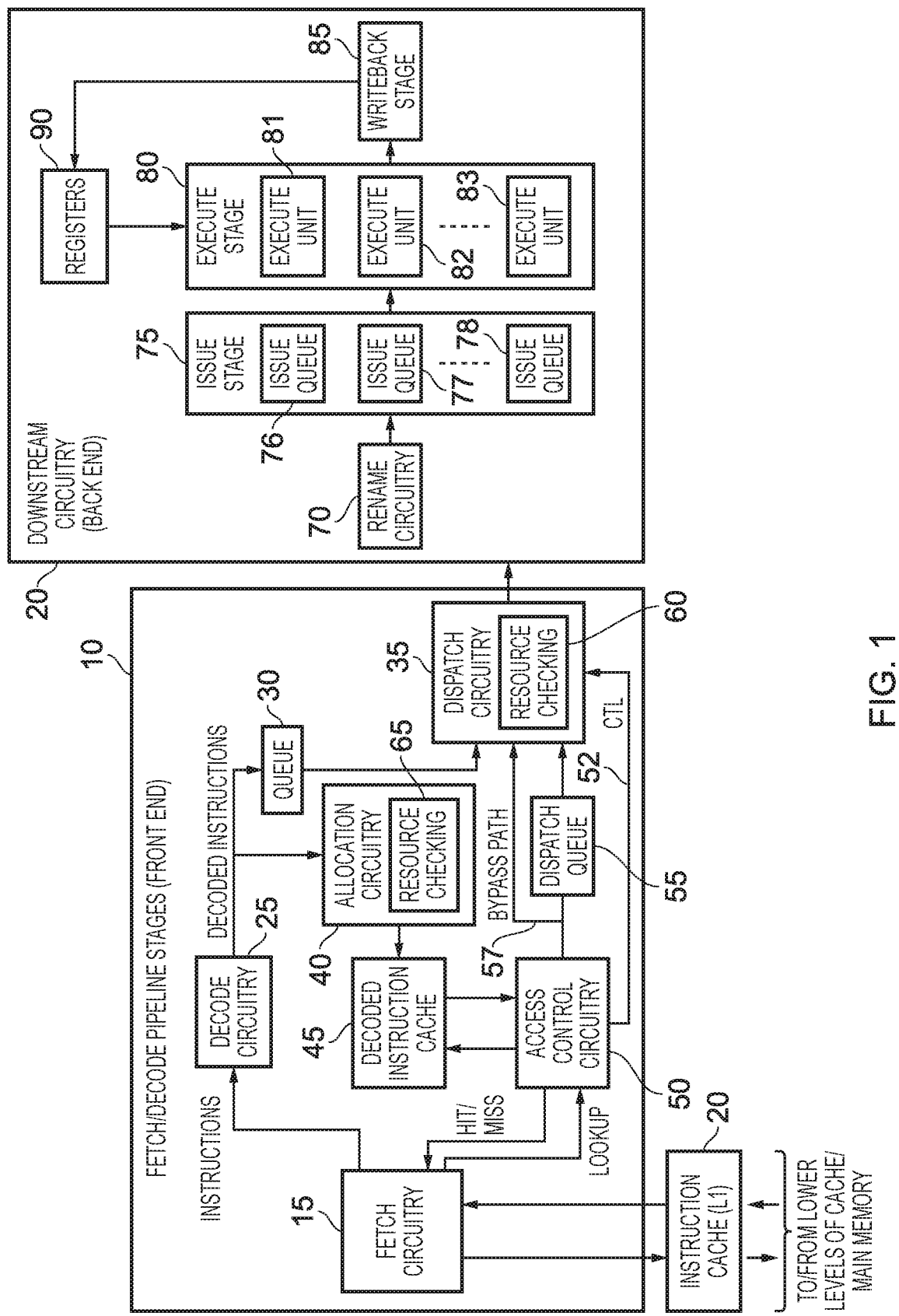
FIG. 1 is a block diagram of a data processing system in accordance with one example arrangement.

In accordance with the techniques described herein, an apparatus is provided that has fetch circuitry for fetching instructions from memory, and decode circuitry to decode fetched instructions in order to produce decoded instructions. The decoded instructions may also be referred to as macro operations (MOPs), and in some instances there may not be a 1:1 correspondence between an instruction and the decoded instruction or decoded instructions generated from it. Hence, for example, the decoding of a single instruction may result in the generation of more than one decoded instruction. Similarly, it is also possible in some implementations that two or more instructions may be fused at decode time in order to produce one decoded instruction/macro operation. It should also be noted for completeness that in some example implementations macro operations can be further split at later points in the processing pipeline to generate a number of micro operations.

The apparatus further comprises downstream circuitry that is used to process the decoded instructions in order to perform the operations specified by those decoded instructions. The downstream circuitry may comprise various components provided within multiple pipeline stages. The apparatus further has dispatch circuitry that is used to dispatch to the downstream circuitry up to N decoded instructions per dispatch cycle, where N is an integer greater than 1. Here, the term dispatch cycle is used to refer to an instance of the dispatch circuitry dispatching a number of instructions to the downstream circuitry, and it should be noted that the number of clock cycles taken to implement each dispatch cycle may vary.

The dispatch circuitry may be arranged to determine, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle. In particular, the number of decoded instructions that the downstream circuitry may be able to handle from the dispatch circuitry in any particular dispatch cycle may depend on a variety of factors, such as the operations defined by those various decoded instructions, the source operands required by those various decoded instructions, etc.

In accordance with the techniques described herein, the dispatch circuitry comprises resource checking circuitry which, by default, is arranged to perform, during the given dispatch cycle, a resource checking operation to generate, for the given candidate sequence of decoded instructions, resource conflict information used to determine whether the at least one resource conflict would occur. However, in accordance with the techniques described herein, the apparatus further comprises resource conflict information cache storage to maintain, for one or more sequences of decoded instructions, associated resource conflict information.

Further, the dispatch circuitry is arranged, in the event that the given candidate sequence being considered matches one of the sequences for which associated resource confliction information is maintained in the resource conflict information cache storage, to employ the associated resource conflict information retrieved from the resource conflict information cache storage to determine whether the at least one resource conflict would occur. In such a situation, the information retrieved from the resource conflict information cache storage can be used without needing to invoke the resource checking circuitry to perform the resource checking operation, and as a result in such situations the performance impact of utilising the resource checking circuitry at during the dispatch cycle can be avoided.

In particular, it may be that performance of the resource checking operation during the dispatch cycle requires the provision of an additional pipeline stage in order to implement the dispatch functionality. Accordingly, by default each dispatch cycle may involve multiple clock cycles, but in instances where it is possible to avoid invoking the resource checking circuitry, and instead to use cached resource conflict information, the additional pipeline stage can be avoided and hence the dispatch cycle can be performed in at least one less clock cycle. It has been found that this can significantly increase performance in a number of situations, for example when seeking to repopulate the processing pipeline following a branch misprediction, since the use of the technique above can enable resumption of execution of instructions to occur earlier than would otherwise be the case.

There are a number of ways in which the resource conflict information can be used. For example, in some implementations it may be the case that the resource conflict information is output from the dispatch stage along with the full candidate sequence of decoded instructions, for use in affecting decisions and/or processing performed within the downstream circuitry. However, in one example implementation, when it is determined that the at least one resource conflict would occur, the dispatch circuitry is further arranged to dispatch in the given dispatch cycle only a selected subset of the decoded instructions in the given candidate sequence. By such a mechanism, the dispatch circuitry can be arranged to dispatch only a subset of decoded instructions which can be dispatched without giving rise to the resource conflict. Any of the decoded instructions in the candidate sequence that are not dispatched in the current dispatch cycle can then be considered for dispatch in a subsequent dispatch cycle.

In order to improve performance by reducing the decode overhead on the decode circuitry, the apparatus may be provided with a decoded instruction cache to store decoded instructions produced by the decode circuitry, the decoded instruction cache comprising a plurality of cache lines, where each cache line is arranged to store a sequence of decoded instructions. The dispatch circuitry can then be arranged, when the decoded instructions for one or more instructions identified for fetching are stored in the decoded instruction cache, to receive the decoded instructions from the decoded instruction cache rather than via the decode circuitry. In such instances, the decode circuitry does not need to decode the relevant instructions again, and accordingly the overall bandwidth for providing decoded instructions to the dispatch circuitry can be improved.

The resource conflict information cache storage can take a variety of forms, but in one example implementation is arranged to maintain associated resource conflict information for each sequence of decoded instructions stored in the decoded instruction cache.

The resource conflict information cache storage may be a separate storage to the decoded instruction cache, but in one example implementation the resource conflict information cache storage is provided within the decoded instruction cache by providing an additional field for each cache line of the decoded instruction cache which is used to store the associated resource conflict information.

In implementations where a decoded instruction cache is used, then during the allocation process used to allocate a new sequence of decoded instructions to an available cache line in the decoded instruction cache, the apparatus can be arranged to cause the resource checking operation to be performed in order to generate the associated resource conflict information. It should be noted that the performance of the resource checking operation at this point is off of the critical path, and in particular does not itself impact on the time taken to implement each dispatch cycle.

The apparatus may be organised in a variety of ways to perform this resource checking operation at the time of allocating a new sequence of decoded instructions into the decoded instruction cache. However, in one example implementation the apparatus further comprises additional resource checking circuitry to perform the resource checking operation during the allocation process. In one example implementation, this can be a different physical instance of the resource checking circuitry that is also provided in association with the dispatch circuitry.

The dispatch circuitry can be organised in a variety of ways but in one example implementation comprises a dispatch queue that is used to buffer decoded instructions that have been retrieved from the decoded instruction cache but have not yet been dispatched. This enables situations to be accommodated where, for example, the rate of retrieval of decoded instructions from the decoded instruction cache exceeds at some points in time the rate at which decoded instructions can be dispatched by the dispatch circuitry, and in particular allows those retrieved decoded instructions to be buffered for subsequent review by the dispatch circuitry.

In one example implementation, the dispatch circuitry comprises a bypass path via which a sequence of decoded instructions retrieved from the decoded instruction cache in a current dispatch cycle may be routed to form a candidate sequence of decoded instructions to be considered for dispatch in the current dispatch cycle in the event that the dispatch queue is empty. This thereby avoids routing the retrieved sequence of decoded instructions through the dispatch queue. However, it should be noted that if the dispatch queue is not empty, then in one example implementation the bypass path would not be used at that point in time, and instead the decoded instructions as retrieved from the decoded instruction cache would be added to the dispatch queue.

When the candidate sequence of decoded instructions being considered for dispatch in the current dispatch cycle is obtained via the bypass path, then the dispatch circuitry can be arranged to use the associated resource conflict information obtained from the resource conflict information cache storage to determine whether the at least one resource conflict would occur, instead of invoking the resource checking circuitry to perform the resource checking operation. Hence, in situations where the bypass path can be used, then the associated cached resource conflict information can also be used at that point in time, hence increasing the performance benefits that can be achieved through the use of the bypass path. In particular, when the bypass path is used, the resource checking circuitry can be disabled, allowing the dispatch cycle to be implemented in less clock cycles than would be the case had the resource checking circuitry needed to have been invoked.

In one example implementation, when the bypass path is used, but the associated resource conflict information as obtained from the resource conflict information cache storage indicates that the at least one resource conflict would occur, the dispatch circuitry may be further arranged to dispatch in the current dispatch cycle only a selected subset of the decoded instructions in the candidate sequence, and to cause any decoded instructions in the candidate sequence not dispatched in the current dispatch cycle to be added to the dispatch queue.

In one example implementation, when in a current dispatch cycle the dispatch queue is non-empty, the dispatch circuitry is arranged to form a candidate sequence of decoded instructions to be considered for dispatch in the current dispatch cycle from those decoded instructions stored in the dispatch queue, and to invoke the resource checking circuitry to perform the resource checking operation to generate the associated resource conflict information used to determine whether the at least one resource conflict would occur. Hence, in situations where the candidate sequence of decoded instructions is formed from the content of the dispatch queue, the resource checking circuitry will be invoked to perform the resource checking operation. However, as discussed earlier, when instead the bypass path can be used, there is no need to invoke the resource checking circuitry, and instead the cached resource conflict information can be used.

As discussed earlier, the resource conflict information can take a variety of forms. In one example implementation, the resource conflict information is used to identify whether the at least one resource conflict would occur in connection with resources available for at least an initial processing stage of the downstream circuitry.

The initial processing stage can take a variety of forms, but in one example implementation comprises an allocation stage used to allocate each operation required by the dispatched decoded instructions to an appropriate processing path within the downstream circuitry. The downstream circuitry can provide multiple processing paths, and each processing path may for example include an associated execution unit, and in one example implementation may also include an issue queue associated with that execution unit. The processing paths will also typically include a writeback component used to commit the results of the processing operations, but in some implementations the writeback component will be shared amongst all of the processing paths/execution units within those processing paths.

In one example implementation, the apparatus may be arranged to support out of order execution of instructions (where the instructions can be executed in a different order to the order in which they appear in the program being executed on the apparatus). To support out of order execution, the allocation stage may comprise rename circuitry used to perform register renaming to map each architectural register specified by the fetched instructions to a physical register within a set of physical registers available to the downstream circuitry. By providing a larger number of physical registers than are specified in the architectural register set, this can allow certain potential operand conflicts to be resolved by using different physical registers, and hence can increase the ability to reorder instruction execution. However, the rename circuitry will typically have a limited number of rename resources to perform the renaming operations, and that can be taken into account when generating the resource conflict information.

Particular examples will now be described with reference to the figures.

FIG. 1 is a block diagram of a data processing system in accordance with one example implementation. The processing circuitry of the data processing system is organised in a pipeline arrangement, and consists of the fetch and decode pipeline stages 10 (also referred to herein as the front end circuitry), and the downstream circuitry 20 used to process the instructions decoded by the front end circuitry in order to perform the operations specified by those decoded instructions, the downstream circuitry also being referred to herein as the back end circuitry.

Fetch circuitry 15 is provided for fetching instructions from memory for execution by the data processing system. The fetch circuitry 15 will typically interface with main memory via one or more levels of cache, including the level one instruction cache 20 shown in FIG. 1. The fetch circuitry may be arranged to operate on fetch granules, where each fetch granule comprises multiple instructions, and hence during each fetch cycle the fetch circuitry may retrieve multiple instructions for subsequent decoding within the fetch/decode pipeline stages 10.

Thus, in any particular fetch cycle, the fetch circuitry may issue a lookup request to the instruction cache 20 specifying a block of instructions to be fetched with reference to a specified address, where the block will comprise between one and all of the instructions from the same fetch granule. Whilst a particular fetch request may seek to retrieve all of the instructions within a fetch granule, this will not always be the case, as the instructions to be fetched will depend on the instruction flow through the computer program. In particular, the computer program being executed on the system will typically include branch instructions that cause discontinuous changes in instruction flow. The fetch circuitry can be coupled to branch prediction circuitry which seeks to make predictions as to whether branch instructions will be take or not, with the fetch circuitry using those predictions to determine the instructions to be fetched. Hence, purely by way of example, if the branch prediction circuitry predicts that the fourth instruction in a particular fetch granule will be a branch instruction that is predicted as taken, the fetch circuitry may only seek to fetch the first four instructions from the fetch granule.

When a fetch request is issued from the fetch circuitry to the instruction cache 20 (also referred to herein as a lookup request to the instruction cache), a lookup operation will be performed in the instruction cache to determine whether the required instructions for the block currently being requested by the fetch circuitry are present within the instruction cache. If so, then a hit will be considered to have occurred, and the fetched instructions will be returned from the instruction cache to the fetch circuitry. In the event of a miss, then the instructions will be retrieved from the lower levels of cache or main memory, and in due course will be returned via the level one instruction cache 20 to the fetch circuitry 15.

Once instructions have been fetched from memory, they are routed to the decode circuitry 25 within the decode pipeline stage of the apparatus. The decode circuitry may include multiple decoders enabling multiple instructions to be decoded per decode cycle. This results in the generation of a number of decoded instructions, which can then be routed via the queue 30 to the dispatch circuitry 35. The decoded instructions can then be dispatched via the dispatch circuitry to the downstream circuitry 20 for subsequent execution within an appropriate execution unit 81, 82, 83 of the execute stage 80. The downstream circuitry will be discussed in more detail later.

To increase the effective bandwidth of the decode stage, and to seek to improve performance, a decoded instruction cache 45 may be provided which can also be used as a source of decoded instructions for passing to the dispatch circuitry 35. In particular, when the instructions are first decoded, then in addition to those decoded instructions being routed via the queue 30 to the dispatch circuitry 35, those decoded instructions may also be forwarded to the allocation circuitry 40 for allocation into the decoded instruction cache 45. In particular, the allocation circuitry will identify an available cache line within the decoded instruction cache 45, and then will allocate the decoded instructions to that cache line.

The decoded instructions produced by the decode circuitry 25 may also be referred to herein as macro operations (MOPs), and similarly the decoded instruction cache may be referred to as a MOP cache. As mentioned earlier, whilst there may be a 1:1 correspondence between the instructions input to the decode circuitry and the decoded instructions generated by decoding the received instructions, this need not be the case and in some instances the decoding of a single instruction may result in the generation of multiple decoded instructions or macro operations. Similarly, in some instances, multiple instructions provided to the decode circuitry may be fused during the decode operation in order to produce a single decoded instruction/macro operation.

When the fetch circuitry 15 is determining a new block of instructions to be fetched, it can be arranged not only to issue a lookup request to the instruction cache 20, but also to issue a lookup request to the access control circuitry 50 used to control access into the decoded instruction cache 45. Hence, a lookup can be performed in parallel within the instruction cache 20, and within the decoded instruction cache 45, with the results of those lookup procedures being returned to the fetch circuitry. If the block of instructions required are determined to already be present within the decoded instruction cache, then those instructions do not need to be fetched from the instruction cache 20, and instead can be routed directly from the decoded instruction cache 45 via the access control circuitry 50 to the dispatch circuitry 35, either via a dispatch queue 55, or in some situations via a bypass path 57 that bypasses the dispatch queue.

Whilst in the above described example, lookups are performed in parallel within the decoded instruction cache 45 and the instruction cache 20, in some implementations it may be possible to save power by turning off the lookup in the instruction cache under a condition where a high hit rate is being obtained from the decoded instruction cache 45, with the instruction cache 20 then subsequently being woken up in order to perform subsequent lookup operations once a miss is detected in the decoded instruction cache.

It will be appreciated from FIG. 1 that in any particular dispatch cycle the dispatch circuitry 35 can be provided with a candidate sequence of decoded instructions for potential dispatch to the downstream circuitry 20 during that dispatch cycle. In any particular dispatch cycle, the candidate sequence of decoded instructions will either come via the decoded instruction cache (i.e. via the bypass path 57 or via the dispatch queue 55), or will come from the queue 30 that has received decoded instructions generated by the decode circuitry 25. The bypass path 57 is used in situations where a hit has occurred in the decoded instruction cache 45, and at that point in time the dispatch queue 55 is empty. In that scenario, up to the maximum number of instructions that can be considered by the dispatch circuitry 35 in any particular dispatch cycle can be forwarded directly over the bypass path 57 to the dispatch circuitry, with any additional instructions retrieved from the decoded instruction cache 45 at that point in time being placed in the dispatch queue 55.

However, whenever at the time of retrieving decoded instructions from the decoded instruction cache 45 in response to a hit being detected by the access control circuitry 50, the dispatch queue 55 is already non-empty, then all of the retrieved instructions will be added into the dispatch queue 55, and the bypass path 57 will not be used. If in due course the dispatch queue becomes empty again, then the bypass path 57 can again be used. Whilst there are at least some decoded instructions in the dispatch queue 55, the dispatch circuitry will be arranged to receive the candidate sequence of decoded instructions for the next dispatch cycle from the dispatch queue, but in the event of a miss being detected in the decoded instruction cache, and the dispatch queue 55 being empty, the dispatch circuitry 35 will receive the candidate sequence of decoded instructions from the queue 30 (this containing the instructions decoded by the decode circuitry 25). The dispatch circuitry 35 will receive a control signal over path 52 to indicate from which source the dispatch circuitry should take its candidate sequence of decoded instructions in any particular dispatch cycle, and in one example implementation this control signal originates from the access control circuitry 50 in dependence on whether a hit or miss has been detected within the decoded instruction cache.

From the above description, it will be appreciated that in each dispatch cycle, the dispatch circuitry 35 will consider a candidate sequence of decoded instructions for dispatch to the downstream circuitry 20. However, it is typically the case that there will be some limitation on the number of decoded instructions that can be received by the downstream circuitry 20 in any particular dispatch cycle, due to the nature of the hardware resources provided within the downstream circuitry. For example, as shown in FIG. 1, the downstream circuitry 20 may include an initial allocation stage (referred to in FIG. 1 as the rename stage 70) that receives the dispatched decoded instructions, and allocates them to particular issue queues 76, 77, 78 within the issue stage 75, the various issue queues being associated with corresponding execute units 81, 82, 83 within the execute stage 80. The various execute units will typically share a set of registers 90, and may be provided with one or more of the source operands required to perform data processing operations allocated to those execute units from those registers. The results generated by the various execute units will be provided to a writeback stage 85 which controls the committing of the results of those instructions, including the writing of results back to destination registers within the set of registers 90.

In the example shown in FIG. 1, it is assumed that the data processing system supports out of order execution, and accordingly the allocation stage circuitry includes rename functionality enabling register renaming to be performed in order to map architectural registers specified by the instructions to physical registers within the set of registers 90 available within the downstream circuitry 20. In particular, the set of physical registers 90 may exceed the number of architectural registers that can be specified by instructions, and by performing register renaming it can be possible to increase the situations in which instructions can be executed out of order with respect to each other, thereby increasing performance.

However, the downstream circuitry 20 will have limitations on the number of decoded instructions it can handle at any particular point in time, and in particular on the number of instructions it can receive from the dispatch circuitry 35 in any particular dispatch cycle. Whilst in some instances it may be able to receive all of the instructions in the candidate sequence being considered by the dispatch circuitry, in other instances it may not be able to do so without a resource conflict arising, for example because the candidate sequence of instructions includes too many operations of the same type, or would give rise to a conflict for access to source operands, etc. In the example illustrated in FIG. 1, the rename resources within the rename circuitry 70 may be such that, whilst in some instances all of the decoded instructions within a candidate sequence can be received and handled, in other instances this may not be possible without giving rise to a resource conflict.

In accordance with the techniques described herein, resource checking circuitry 60 is provided within the dispatch circuitry 35 to perform a resource checking operation in order to determine, for a particular candidate sequence of decoded instructions being considered in a current dispatch cycle, whether a resource conflict would arise if all of those decoded instructions were to be dispatched in the current dispatch cycle. If it is determined that no resource conflict is present, then all of the decoded instructions can be dispatched to the downstream circuitry 20 for handling by the rename circuitry 70, and for onward processing through the issue, execute and writeback stages 75, 80, 85 of the downstream circuitry 20. However, in the event that the resource conflict is detected, then only a subset of the decoded instructions in the candidate sequence being considered will be dispatched in the current dispatch cycle, namely the subset that can be dispatched without giving rise to the resource conflict within the downstream circuitry 20.

However, the requirement for this resource checking operation can impact performance within the data processing system. For example, it may result in the addition of an additional pipeline stage for each dispatch cycle, hence lengthening the pipeline. Whilst in a steady state there may be a continuous stream of decoded instructions passing through the pipeline stages 10, 20 of the system, an increase in the pipeline length can give rise to performance problems in certain situations, for example following a branch misprediction where it will typically be necessary to flush the pipeline stages 10, 20 and to start refetching instructions from a new target address. At this point, the extra pipeline stage introduced by the need to perform resource checking can significantly impact performance.

However, in accordance with the techniques described herein, a mechanism is provided that can avoid the need to perform resource checking using the resource checking circuitry 60 in the dispatch circuitry 35 in certain situations. In particular, a cache storage is provided for caching resource conflict information computed for one or more particular sequences of decoded instructions, enabling that cached information to be used in situations where any one of those one or more particular sequences of decoded instructions is being considered by the dispatch circuitry 35.

Whilst the resource conflict information cache storage can be implemented in a variety of ways, in accordance with the technique shown in FIG. 1 the resource conflict information cache mechanism is incorporated within the decoded instruction cache 45, by providing additional storage to store the resource conflict information for the sequences of decoded instructions stored in the various cache lines of the decoded instruction cache 45. As shown in FIG. 1, the allocation circuitry 40 is supplemented by the provision of another instance of the resource checking circuitry 65, so that at the time a cache line is allocated to store a particular sequence of decoded instructions generated by the decode circuitry 65, the resource checking circuitry 65 can also generate the resource conflict information for that particular sequence of decoded instructions, with the generated resource conflict information being stored in the decoded instruction cache 45 in association with the sequence of decoded instructions.

Then, on detection in due course of a hit within the decoded instruction cache 45, the resource conflict information can be retrieved from the decoded instruction cache in addition to the sequence of decoded instructions from the hit cache line. In instances where the bypass path 57 is used, then that retrieved resource conflict information can be passed along with the decoded instructions to the dispatch circuitry 35 over the bypass path, where it can be used directly by the dispatch circuitry 35 without needing to invoke the resource checking circuitry 60 to perform a resource checking operation. This can give rise to a significant increase in performance.

It should be noted that in the example implementation shown, in the event that the dispatch queue 55 is non-empty, then the retrieved decoded instructions will be stored within the dispatch queue, and at this point the retrieved resource conflict information will not be used, since it is then not known exactly what combination of decoded instructions will be considered by the dispatch circuitry 35 in a subsequent dispatch cycle based on the contents of the dispatch queue. Instead, when the dispatch circuitry does obtain a candidate sequence of decoded instructions from the dispatch queue 55, or indeed when it retrieves a candidate sequence of decoded instructions from the queue 30 provided at the output of the decode circuitry 25, the resource checking circuitry 60 will be triggered to perform the resource conflict check.

It has been found to be particularly beneficial to enable cached resource conflict information to be used when employing the bypass path 57, since in such situations a saving of at least one clock cycle can be realised by effectively merging two of the pipeline stages, this being possible due to the ability to avoid invoking the resource checking circuitry 60 of the dispatch circuitry 35 to perform the resource checking operation at that point in time. Considering the earlier example of the potential performance hit following a branch misprediction, then it has been found that the above described mechanism can result in significant performance savings, since it is often the case that the bypass path 57 can be used following such a branch misprediction, and hence the time taken to resume execution of instructions can be reduced.

Figure 2:
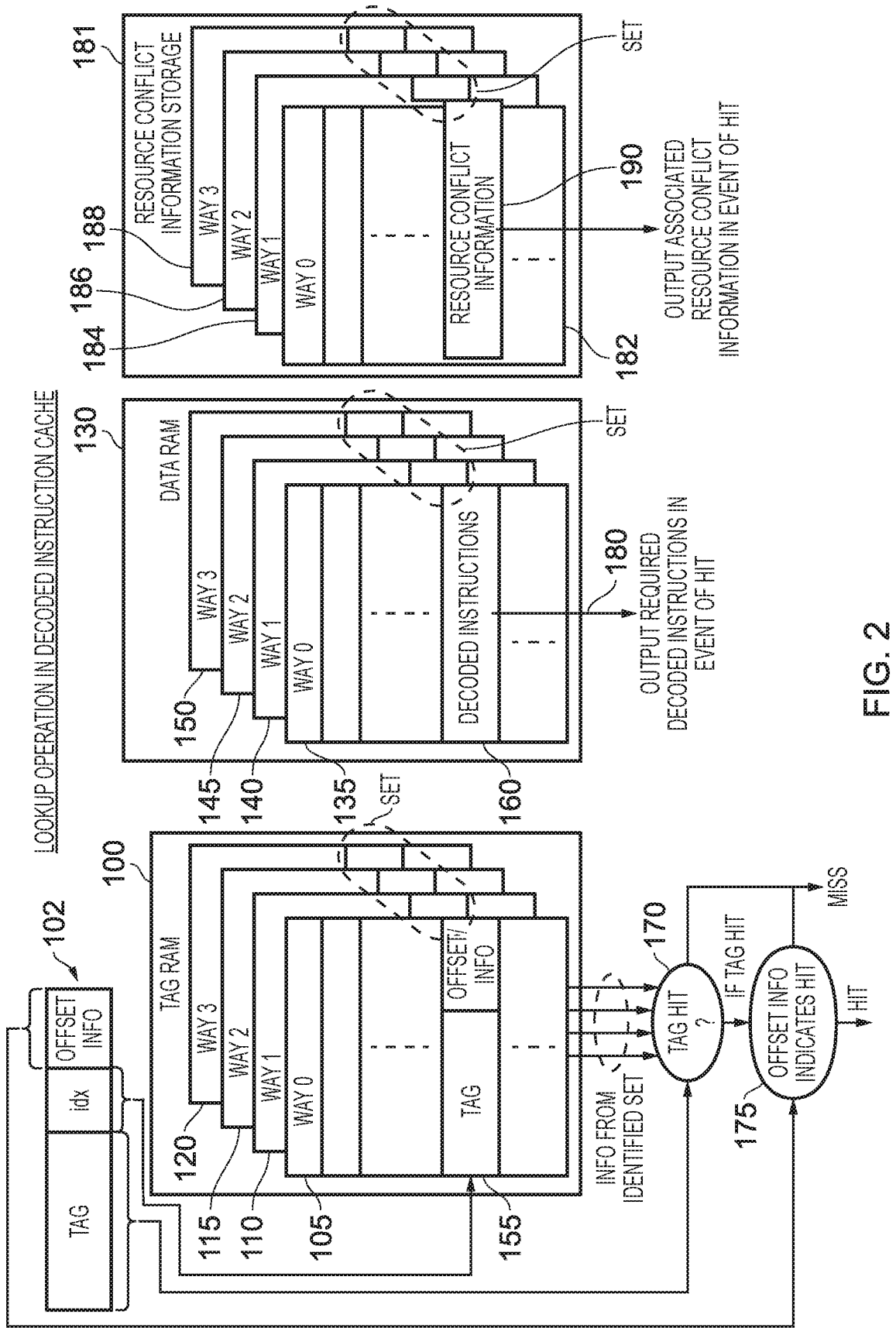
FIG. 2 illustrates in more detail the decoded instruction cache of FIG. 1, and the performance of a lookup operation within that decoded instruction cache, in accordance with one example implementation.

The decoded instruction cache 45 can be organised in a variety of ways, and hence purely by way of example could be a fully associative cache. However, as shown in FIG. 2, in one example implementation the decoded instruction cache is arranged as a set associative cache. Hence, the decoded instruction cache consists of a tag RAM 100 having a plurality of entries organised into multiple ways 105, 110, 115, 120. Each TAG RAM entry 155 includes an address portion referred to as a tag portion of the address, and some offset information used to identify which instructions within the fetch granule are stored in the corresponding cache line 160 of the data RAM 130. In particular, as shown in FIG. 2, the data RAM 130 is also arranged into a plurality of ways 135, 140, 145, 150, each way comprising a plurality of cache lines 160, where each cache line can store multiple decoded instructions. The corresponding entry 155 in the TAG RAM 100 provides, via the tag portion, sufficient information to identify the fetch granule to which the decoded instructions in the corresponding cache line relate. The offset information in the corresponding tag entry 155 then enables an identification of which instructions within the fetch granule are represented by the decoded instructions in the cache line.

When a lookup request is issued by the fetch circuitry 15, the address information is provided in the form 102 shown in FIG. 2. In particular, an index portion of the address is used to identify a particular set within the cache, hence identifying a particular set of TAG RAM entries and a corresponding set of cache lines. The tag information in each of the entries 155 within the identified set are then output to comparison circuitry 170 which compares that tag information with the tag portion of the fetch request address 102. In the event of a hit being detected in one of the entries, this means that the decoded instruction cache currently stores one or more instructions for the fetch granule identified by the tag and index bits of the fetch address 102. However, in one example implementation the corresponding cache line 160 may only store some of the decoded instructions for the fetch granule, and accordingly a further check may be performed by comparison circuitry 175 to determine whether the offset information from the hit TAG RAM entry 155 matches with the offset information specified by the address 102. It if does, then a hit is indicated to the fetch circuitry, and the instructions for the currently required block do not need to be fetched by the fetch circuitry 15 or decoded by the decode circuitry 25, and instead the corresponding decoded instructions will be output directly over path 180 from the appropriate cache line 160. However, in the event of a miss being detected by the comparison circuitry 170, 175, then the fetch circuitry will need to fetch instructions for the current required block, and those instructions are then decoded by the decode circuitry.

As shown in FIG. 2, the storage within the decoded instruction cache can be supplemented to provide resource conflict information storage 181, which can be considered to comprise a plurality of entries organised in a plurality of ways 182, 184, 186, 188. For each cache line 160 in the data RAM 130, associated resource conflict information 190 as generated by the resource checking circuitry 65 provided in the allocation circuitry 40 can be stored for subsequent reference in the event of a hit being detected in the decoded instruction cache. In particular, when the required decoded instructions are output over path 180 from a hit cache line entry, the corresponding resource conflict information can be output from the resource conflict information storage 181, and as discussed earlier that resource conflict information may be output over the bypass path 57 in the event that the retrieved decoded instructions can be sent over the bypass path.

The resource conflict information storage 181 could be separate storage, or could be merged into the decoded instruction cache. In one example implementation the resource conflict information storage 181 is provided via additional fields within the cache lines of the decoded instruction cache, and hence is not formed as a separate storage.

Figure 3:
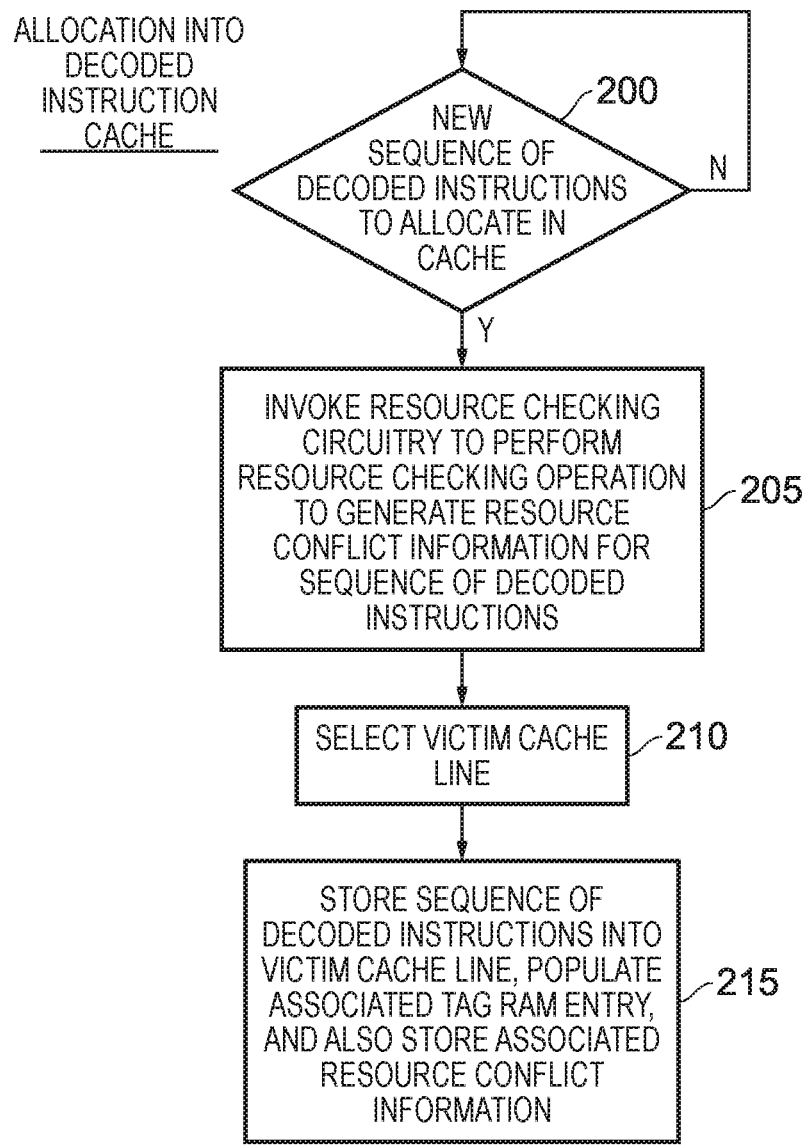
FIG. 3 is a flow diagram illustrating steps performed in order to allocate decoded instructions into the decoded instruction cache, in accordance with one example implementation.

FIG. 3 is a flow diagram illustrating steps performed when allocating decoded instructions into the decoded instruction cache 45 using the allocation circuitry 40. At step 200 it is determined whether there is a new sequence of decoded instructions to allocate into the cache. When a new sequence of decoded instructions is generated by the decode circuitry 25, this will be detected by the allocation circuitry 40 at step 200, and the process will proceed to step 205 where the allocation circuitry 40 invokes the resource checking circuitry 65 to perform a resource checking operation in order to generate resource conflict information for the particular sequence of decoded instructions that are to be allocated into the decoded instruction cache.

Thereafter, at step 210, a victim cache line is selected using any suitable victim selection policy, for example a least recently used policy, and thereafter at step 215 the sequence of decoded instructions is allocated into the victim cache line, the associated TAG RAM entry is populated with the information discussed earlier with reference to FIG. 2, and also the associated resource conflict information is stored into the decoded instruction cache in association with the decoded instructions.

FIG. 4 schematically illustrates how the resource conflict information will vary dependent on the exact sequence of decoded instructions being considered in any particular dispatch cycle. In particular, FIG. 4 shows a sequence of seven instructions, but shows two different streams of execution through those instructions. For the first stream shown, it is assumed that the sequence of decoded instructions starts with the add instruction, and the branch not equal (BNE) instruction is at the 7th place in that stream. However, it is also considered that at some subsequent point a second stream through the program results in a sequence of decoded instructions for a particular dispatch cycle starting with the AND instruction, at which point the BNE instruction is at the $3^{rd}$ place in the stream. This difference may cause entirely different resource checking information to be generated dependent on the particular sequence of decoded instructions that are a candidate for dispatch in a particular dispatch cycle. However, as will be apparent from the earlier discussions, the cached resourced conflict information is associated with a specific block of decoded instructions stored within a cache line of the decoded instruction cache, and is only ever used if that specific block of instructions forms the candidate sequence of instructions being considered by the dispatch circuitry, in particular where those decoded instructions are output over the bypass path 57 directly to the dispatch circuitry 35 from the access control circuitry 50, and accordingly the associated resource checking information can be used directly by the dispatch circuitry.

Figure 5:
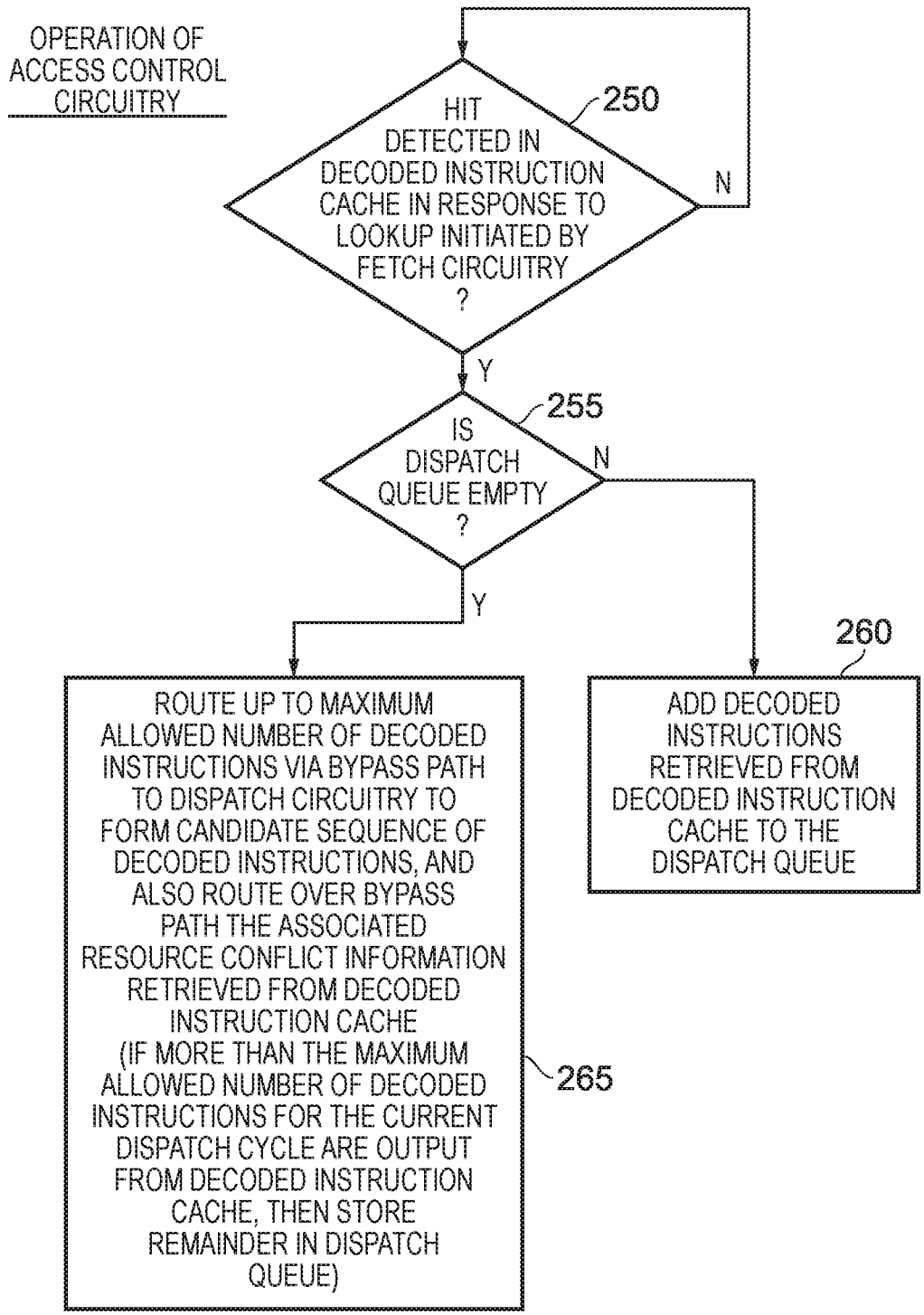
FIG. 5 is a flow diagram illustrating the operation of the access control circuitry of FIG. 1 in one example implementation, when a hit is detected in the decoded instruction cache.

FIG. 5 is a flow diagram illustrating the operation of the access control circuitry 50 of FIG. 1 in situations where a hit is detected in the decoded instruction cache in response to a lookup initiated by the fetch circuitry 15. When such a scenario is detected at step 250, it is determined at step 255 whether the dispatch queue 55 is empty. If not, then the decoding instructions retrieved from the decoded instruction cache are added to the dispatch queue 55 at step 260.

However, if it is determined at step 255 that the dispatch queue is empty, then at step 265 the access control circuitry 50 routes up to a maximum allowed number of decoded instructions via the bypass path 57 to the dispatch circuitry 35 to form a candidate sequence of decoded instructions, and also routes over the bypass path the associated resource conflict information retrieved from the decoded instruction cache.

In one example implementation, it is possible that the access control circuitry may be arranged so that it can perform more than one lookup in the same cycle, and hence could retrieve more than one cache line's worth of decoded instructions. In that event, it may be that the number of retrieved decoded instructions exceeds the number that can be routed to the dispatch circuitry in a particular dispatch cycle, and in that event any surplus instructions will be added directly to the dispatch queue 55. It should be noted that for any block of instructions stored in the dispatch queue, the associated resource conflict information is not maintained, since it is not known exactly how the instructions will be retrieved from the dispatch queue, and hence the exact nature is not known of any particular candidate sequence of instructions that will be considered in a subsequent dispatch cycle by the dispatch circuitry based on the contents of the dispatch queue 55.

Figure 6:
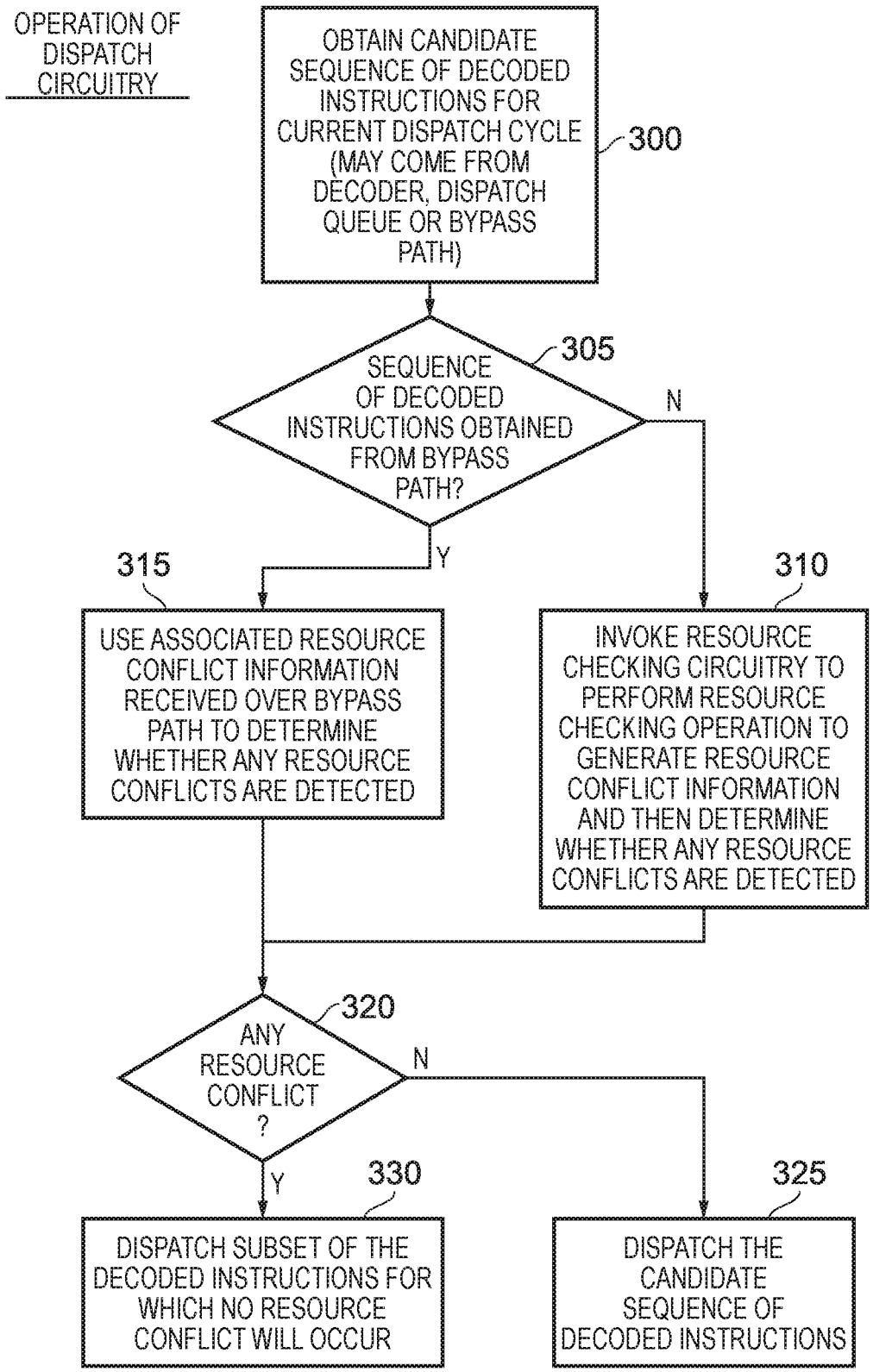
FIG. 6 is a flow diagram illustrating the operation of the dispatch circuitry of FIG. 1 in one example implementation.

FIG. 6 is a flow diagram illustrating the operation of the dispatch circuitry 35 of FIG. 1 in one example implementation. At step 300, a candidate sequence of decoded instructions is obtained for the current dispatch cycle. As discussed earlier, in any particular dispatch cycle, the sequence of decoded instructions will either come from the decoded instruction cache (either via the bypass path 57, or from the dispatch queue 55), or will come from the queue 30 used to buffer decoded instructions generated by the decode circuitry 25.

At step 305 it is determined whether the sequence of decoded instructions is obtained from the bypass path, and if not the resource checking circuitry is invoked at step 310 to perform a resource checking operation to generate resource conflict information in order to determine whether any resource conflicts would occur if the candidate sequence of decoded instructions were to be dispatched in its entirety to the downstream circuitry 20 in the current dispatch cycle.

However, if the sequence of decoded instructions is obtained from the bypass path, then the process proceeds to step 315 where the associated resource conflict information received over the bypass path is used to determine whether any resource conflicts are detected, thereby avoiding the need to invoke the resource checking circuitry 60 in such situations. This allows an improvement in performance by effectively enabling multiple pipeline stages to be merged, and in particular by avoiding the need for an additional clock cycle or more to perform the resource checking operation.

At step 320, it is determined whether there is any resource conflict detected, and if not the candidate sequence of decoded instructions is dispatched at step 325. However, in the presence of a resource conflict, then at step 330 only a subset of the decoded instructions is dispatched, namely a subset for which no resource conflict will occur. Any decoded instructions which are not dispatched from amongst the candidate sequence of decoded instructions will be retained within the relevant queue, i.e. the dispatch queue 55 or the queue 30. Further, in the event that the sequence of decoded instructions was retrieved via the bypass path, then any decoded instructions that are not dispatched will be added into the dispatch queue 55 for subsequent consideration during a subsequent dispatch cycle.

Figure 7:
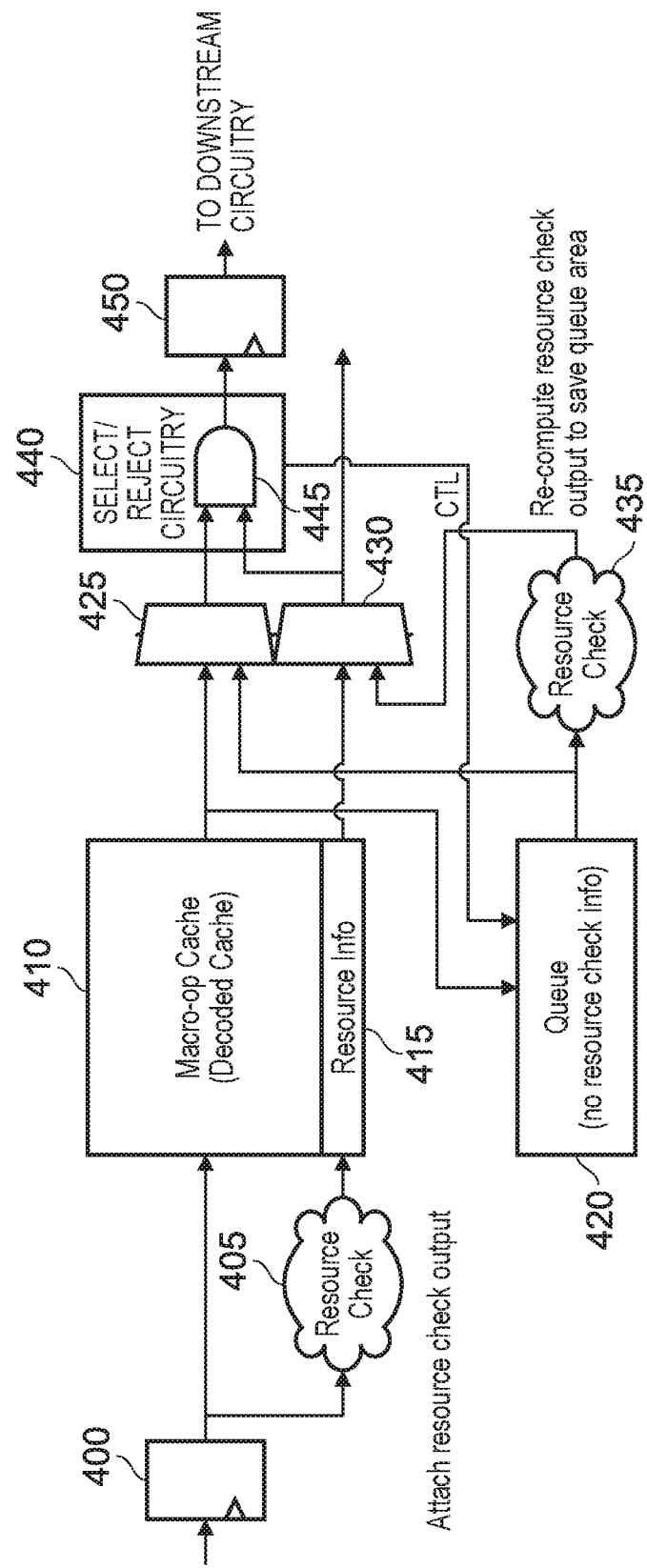
FIG. 7 is a diagram schematically illustrating the various resource checking mechanisms provided in accordance with one example implementation.

FIG. 7 schematically illustrates the various locations at which resource checking may be performed in one example implementation. As shown in FIG. 7, at the time of allocating into the decoded instruction cache a block of decoded instructions latched within the storage element 400, a resource checking operation 405 may be performed (using the resource checking circuitry 65 of the allocation circuitry 40 shown in FIG. 1) in order to generate resource conflict information 415 which is stored within the macro operation cache 410 (i.e. the decoded instruction cache) in association with the corresponding block of decoded instructions.

In the event of a hit being detected within the decoded instruction cache in due course, then the decoded block of instructions from the hit cache line will be routed to the multiplexer 425, and the associated resource conflict information will be routed to the multiplexer 430. The retrieved decoded instructions are also forwarded to the queue 420, i.e. the dispatch queue 55 shown in FIG. 1, but no resource conflict information is propagated to that queue.

In the event that the queue 420 is empty, then the decoded instructions output from the macro op cache 410, along with the associated resource conflict information, can be propagated through the multiplexers 425, 430 for analysis by the select/reject circuitry 440, which can be considered to be contained within the dispatch circuitry 35. In the absence of any resource conflicts, all of the retrieved instructions can be output via the storage element 450 to the downstream circuitry, but in the event of any resource conflicts, only a subset of the retrieved instructions will be selected, and a control signal will be returned to the queue 420 to identify which of the retrieved decoded instructions were not sent, and hence which decoded instructions need to be retained within the queue for consideration in a subsequent dispatch cycle.

In instances where the queue 420 is non-empty, then in a current dispatch cycle the decoded instructions will be retrieved from the queue and routed via the multiplexer 425 to the select/reject circuitry 440. Further, the resource check operation 435 will be performed (using the resource checking circuitry 60 of the dispatch circuitry 35) in order to generate the associated resource conflict information, which will then be routed via the multiplexer 430 to the select/reject circuitry 440. The select/reject circuitry 440 then operates as discussed earlier in order to decide whether there is or is not a resource conflict, and hence whether all or only a subset of the candidate sequence of decoded instructions can be issued to the downstream circuitry.

In one example implementation, the resource conflict information can be propagated on to the downstream circuitry, for example for use when controlling the allocation of resources downstream in the absence of a conflict.

FIG. 8 is a diagram schematically illustrating how multiple pipelines stages can be merged in situations where the bypass path can be used, and accordingly the associated cached resource conflict information can be used. As shown in both the upper and lower parts of FIG. 8, during the F0 and F1 stages, TAG RAM and data RAM reads are performed within the decoded instruction cache in order to determine whether a hit is detected. In the event of a hit being detected, then during the F2 stage way multiplexing is performed in order to select the way that hit within the decoded instruction cache. Entry alignment is also performed in the F2 stage during the cycle description that does not employ the bypass path (the upper example of FIG. 8), in order to align the retrieved instructions for writing into the dispatch queue 55, with the instructions then being written into the queue at the end of the F2 stage. In the DE stage the dispatch queue 55 is read, and the retrieved macro operations are then decompressed in order to create the format of those macro operations as required for the downstream circuitry 20. The Port Share functionality then implements the earlier-described resource checking operation whose aim is to limit, where necessary, the number of macro operations presented to the rename stage 70 of the downstream circuitry in a current dispatch cycle taking into account the limited rename resources. As discussed earlier, there can be various limitations within the downstream circuitry, and in particular in association with the rename circuitry, in terms of bandwidth limitations, rename table limitations, etc.

Continuing to consider the cycle by cycle description where the bypass path is not used, then in the RR stage, the determined number of macro operations are presented to the rename circuitry, and thereafter in the RD stage the rename circuitry 70 dispatches the decoded instructions to the relevant issue queues 76, 77, 78. Subsequent issue, execute and commit stages are then performed.

However, as can be seen from the lower part of FIG. 8, in the event that the bypass path can be used, the F2 and DE stages can effectively be merged, since a number of the functions that are performed when the bypass path is not used are no longer required. In particular, since the dispatch queue is not being used, then the entry alignment, writing into the queue and reading from the queue processes are not required. Further, the earlier-described Port Share functionality is not required, since the cached resource conflict information obtained from the decoded instruction cache is used directly by the dispatch circuitry. Accordingly, at the end of the merged F2/DE stage the determined macro operations can be written into the rename stage. Thereafter, the pipeline continues as discussed earlier. From FIG. 8 it will be clear that one pipeline stage is able to be removed when the bypass path can be adopted, due to the caching of resource conflict information that takes place in accordance with the techniques described herein, and this can give rise to significant performance improvements.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
fetch circuitry to fetch instructions from memory;
decode circuitry to decode fetched instructions in order to produce decoded instructions;
a decoded instruction cache to store the decoded instructions produced by the decode circuitry, the decoded instruction cache comprising a plurality of cache lines, where each cache line is arranged to store a sequence of decoded instructions;
downstream circuitry to process the decoded instructions in order to perform the operations specified by those decoded instructions; and
dispatch circuitry arranged to dispatch to the downstream circuitry up to N decoded instructions per dispatch cycle, where N is an integer greater than 1;
wherein:
the dispatch circuitry comprises a dispatch queue to buffer decoded instructions that have been retrieved from the decoded instruction cache but have not yet been dispatched;
the dispatch circuitry comprises a bypass path via which the dispatch circuitry is configured to route a sequence of decoded instructions retrieved from the decoded instruction cache in a current dispatch cycle to form a candidate sequence of decoded instructions to be considered for dispatch in the current dispatch cycle in the event that the dispatch queue is empty, thereby avoiding routing of the retrieved sequence of decoded instructions through the dispatch queue;
the dispatch circuitry is arranged, when the decoded instructions for one or more instructions identified for fetching are stored in the decoded instruction cache, to receive the decoded instructions from the decoded instruction cache rather than via the decode circuitry;
the dispatch circuitry is arranged to determine, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle;
the dispatch circuitry comprises resource checking circuitry which by default is arranged to perform, during the given dispatch cycle, a resource checking operation to generate, for the given candidate sequence of decoded instructions, resource conflict information used to determine whether the at least one resource conflict would occur;
the apparatus further comprises resource conflict information cache storage to maintain, for one or more sequences of decoded instructions including each sequence of decoded instructions stored in the decoded instruction cache, associated resource conflict information;
the dispatch circuitry is arranged, in the event that the given candidate sequence matches one of the sequences for which associated resource conflict information is maintained in the resource conflict information cache storage, to bypass the resource checking operation and instead employ the associated resource conflict information retrieved from the resource conflict information cache storage to determine whether the at least one resource conflict would occur; and
when the candidate sequence of decoded instructions being considered for dispatch in the current dispatch cycle is obtained via the bypass path, the dispatch circuitry is arranged to use the associated resource conflict information obtained from the resource conflict information cache storage to determine whether the at least one resource conflict would occur, instead of invoking the resource checking circuitry to perform the resource checking operation.

2. The apparatus as claimed in claim 1, wherein, when it is determined that the at least one resource conflict would occur, the dispatch circuitry is further arranged to dispatch in the given dispatch cycle only a selected subset of the decoded instructions in the given candidate sequence.

3. The apparatus as claimed in claim 1, wherein the resource conflict information cache storage is provided within the decoded instruction cache by providing an additional field for each cache line of the decoded instruction cache which is used to store the associated resource conflict information.

4. The apparatus as claimed in claim 1, wherein, during an allocation process used to allocate a new sequence of decoded instructions to an available cache line in the decoded instruction cache, the resource checking operation is performed to generate the associated resource conflict information.

5. The apparatus as claimed in claim 4, further comprising additional resource checking circuitry to perform the resource checking operation during the allocation process.

6. The apparatus as claimed in claim 1, wherein, when it is determined that the at least one resource conflict would occur, the dispatch circuitry is further arranged to dispatch in the current dispatch cycle only a selected subset of the decoded instructions in the candidate sequence, and to cause any decoded instructions in the candidate sequence not dispatched in the current dispatch cycle to be added to the dispatch queue.

7. The apparatus as claimed in claim 1, wherein, when at the time of retrieving decoded instructions from the decoded instruction cache the dispatch queue contains one or more decoded instructions, the retrieved decoded instructions are added to the dispatch queue rather than being routed over the bypass path.

8. The apparatus as claimed in claim 1, wherein when in a current dispatch cycle the dispatch queue is non-empty, the dispatch circuitry is arranged to form a candidate sequence of decoded instructions to be considered for dispatch in the current dispatch cycle from those decoded instructions stored in the dispatch queue, and to invoke the resource checking circuitry to perform the resource checking operation to generate the associated resource conflict information used to determine whether the at least one resource conflict would occur.

9. The apparatus as claimed in claim 1, wherein the resource conflict information is used to identify whether the at least one resource conflict would occur in connection with resources available for at least an initial processing stage of the downstream circuitry.

10. The apparatus as claimed in claim 9, wherein the initial processing stage comprises an allocation stage used to allocate each operation required by the dispatched decoded instructions to an appropriate processing path within the downstream circuitry.

11. The apparatus as claimed in claim 10, wherein the allocation stage comprises rename circuitry used to perform register renaming to map each architectural register specified by the fetched instructions to a physical register within a set of physical registers available to the downstream circuitry.

12. A method of processing instructions fetched from memory, comprising:
decoding the fetched instructions in order to produce decoded instructions;
employing downstream circuitry to process the decoded instructions in order to perform the operations specified by those decoded instructions; and
storing the decoded instructions produced by the decode circuitry in a decoded instruction cache, the decoded instruction cache comprising a plurality of cache lines, where each cache line is arranged to store a sequence of decoded instructions;
performing a dispatch process to dispatch to the downstream circuitry up to N decoded instructions per dispatch cycle, where N is an integer greater than 1;
wherein:
the dispatch process comprises buffering decoded instructions that have been retrieved from the decoded instruction cache but have not yet been dispatched in a dispatch queue;
the dispatch process comprises, in the event that the dispatch queue is empty, routing a sequence of decoded instructions retrieved from the decoded instruction cache in a current dispatch cycle to form a candidate sequence of decoded instructions to be considered for dipath in the current dispatch cycle, thereby avoiding routing of the retrieved sequence of decoded instructions through the dispatch queue;
the dispatch process comprises receiving, when the decoded instructions for one or more instructions identified for fetching are stored in the decoded instruction cache, the decoded instructions from the decoded instruction cache;
the dispatch process comprises determining, based on a given candidate sequence of decoded instructions being considered for dispatch in a given dispatch cycle, whether at least one resource conflict within the downstream circuitry would occur in the event that the given candidate sequence of decoded instructions is dispatched in the given dispatch cycle;
the dispatch process is arranged, by default, to employ resource checking circuitry to perform, during the given dispatch cycle, a resource checking operation to generate, for the given candidate sequence of decoded instructions, resource conflict information used to determine whether the at least one resource conflict would occur;

the method further comprises maintaining within a resource conflict information cache storage, for one or more sequences of decoded instructions including each sequence of decoded instructions stored in the decoded instruction cache, associated resource conflict information;
the dispatch process is arranged, in the event that the given candidate sequence matches one of the sequences for which associated resource conflict information is maintained in the resource conflict information cache storage, to bypass the resource checking operation and instead employ the associated resource conflict information retrieved from the resource conflict information cache storage to determine whether the at least one resource conflict would occur; and
the dispatch process comprises using, when the candidate sequence of decoded instruction being considered for dispatch in the current dispatch cycle is obtained via the bypass path, the associated resource conflict information obtained from the resource conflict information cache storage to determine whether the at least one resource conflict would occur, instead of invoking the resource checking circuitry to perform the resource checking operation.

13. An apparatus comprising:
fetch means for fetching instructions from memory;
decode means for decoding fetched instructions in order to produce decoded instructions;
decoded instruction caching means to store the decoded instructions produced by the decode means, the decoded instruction caching means comprising a plurality of cache lines, where each cache line is arranged to store a sequence of decoded instructions;
downstream processing means for processing the decoded instructions in order to perform the operations specified by those decoded instructions; and
dispatch means for dispatching to the downstream processing means up to N decoded instructions per dispatch cycle, where N is an integer greater than 1;
wherein:
the dispatch means comprises a dispatch queue means to buffer decoded instructions that have been retrieved from the decoded instruction storage means but have not yet been dispatched;
the dispatch means comprises a bypass means via which the dispatch means is configured to route a sequence of decoded instructions retrieved from the decoded instruction caching means in a current dispatch cycle to form a candidate sequence of decoded instructions to be considered for dispatch in the current dispatch cycle in the event that the dispatch queue means is empty, thereby avoiding routing of the retrieved sequence of decoded instructions through the dispatch queue means;
the dispatch means is arranged, when the decoded instructions for one or more instructions identified for fetching are stored in the decoded instruction caching means, to receive the decoded instructions from the decoded instruction caching means rather than via the decode means;
the dispatch means is for determining, based on a given candidate sequence of decoded instructions being considered for dispatch in a given dispatch cycle, whether at least one resource conflict within the downstream processing means would occur in the event that the given candidate sequence of decoded instructions is dispatched in the given dispatch cycle;

the dispatch means comprises resource checking means for performing, during the given dispatch cycle, a resource checking operation to generate, for the given candidate sequence of decoded instructions, resource conflict information used to determine whether the at least one resource conflict would occur;

the apparatus further comprises resource conflict information caching means for maintaining, for one or more sequences of decoded instructions including each sequence of decoded instructions stored in the decoded instruction caching means, associated resource conflict information;

the dispatch means is arranged, in the event that the given candidate sequence matches one of the sequences for which associated resource conflict information is maintained in the resource conflict information caching means, to bypass the resource checking operation and instead employ the associated resource conflict information retrieved from the resource conflict information caching means to determine whether the at least one resource conflict would occur; and when the candidate sequence of decoded instructions being considered for dispatch in the current dispatch cycle is obtained via the bypass means, the dispatch means is arranged to use the associated resource conflict information obtained from the resource conflict information caching means to determine whether the at least one resource conflict would occur, instead of invoking the resource checking means to perform the resource checking operation.

\* \* \* \* \*